Robert Aprahamian
Pravin G. Bhuta
INVENTORS

ATTORNEY

Robert Aprahamian
Pravin G. Bhuta
INVENTORS

ATTORNEY

United States Patent Office 3,626,753
Patented Dec. 14, 1971

3,626,753
ACOUSTO-HOLOGRAPHIC METHOD AND APPARATUS FOR INTERNALLY IMAGING AND INTERFEROMETRICALLY ANALYZING OBJECTS
Robert Aprahamian, Culver City, and Pravin G. Bhuta, Torrance, Calif., assignors to TRW Inc., Redondo Beach, Calif.
Filed Mar. 5, 1970, Ser. No. 16,636
Int. Cl. G01b 5/30; G01n 29/00
U.S. Cl. 73—88 A                                   12 Claims

ABSTRACT OF THE DISCLOSURE

An acousto-holographic method of an apparatus for internally imaging and interferometrically analyzing objects, particularly objects which are optically opaque. The object to be examined is acoustically coupled to an acoustic source of fixed frequency and to an acoustic wave transmission medium in a manner such that acoustic wave energy from the source is transmitted through the object to the acoustic medium to produce within the medium distorted acoustic waves containing information defining an image of the object. This acoustic wave information is transformed to equivalent holographic information by a light-sound wave interaction involving passage of an object beam from a laser through the distorted acoustic waves to produce an object beam sideband of given order defining an image of the object, modulating a reference beam from the laser to obtain a reference beam sideband of the same order as the object sideband, and mixing the object and reference sidebands to produce a hologram for reconstructing a three-dimensional interior image of the object. The object may be strained after the initial exposure and the holographic film then reexposed to provide a hologram for reconstructing an interior three-dimensional image of the object displaying the internal stress pattern of the object.

RELATED APPLICATIONS

Reference is made herein to copending applications, Ser. No. 803,291, filed Feb. 28, 1969 and entitled "Acousto-Optical Method and Apparatus," and Ser. No. 829,000, filed May 29, 1969 and entitled "Acousto-Optical Echo Imaging Method and Apparatus."

BACKGROUND OF THE INVENTION

(1) Field of the invention

This invention relates generally to the field of holography and to the field of technology, referred to herein as acousto-optics, which involves the transformation of acoustic wave information to equivalent light information by the interaction of light waves with acoustic waves. More particularly, the invention relates to a novel acousto-holographic method of an apparatus for internally imaging and interferometrically analyzing objects which may be optically opaque.

(2) Prior art

As is well-known to those versed in the art of holography, the production of a hologram involves illuminating an object or other subject with an object from a laser, mixing the reflected or transmitted light from the object with a reference beam from the laser to produce a fringe pattern, and photographically recording the fringe pattern on a holographic plate. Subsequent reconstruction of a three-dimensional image of the object is accomplished by looking through the hologram while the latter is illuminated by the reference beam. If the object is strained following the first exposure of the holographic plate and the latter is re-exposed, an interferometric fringe pattern will be produced on the hologram. In this case, the holographic image displays the stress pattern resulting from straining the object.

Conventional optical holography may be utilized to image the exterior of an opaque object or the interior of an optically transparent object or other subject. It is also possible with an existing holographic technique known as acoustic holography to internally image an optically opaque object. The present invention provides a new acousto-holographic technique for imaging the interior of an optically opaque object. This is accomplished, in essence, by combining the conventional optical holographic technique with the acousto-optical imaging technique disclosed in the earlier mentioned copending applications.

As noted in the copending applications, one of the known techniques of examining objects which may be optically opaque involves an acousto-optical imaging technique known as ultrasonic imaging. According to this technique, the object to be examined is acoustically coupled to an acoustic wave transmission medium and is then impinged by acoustic wave energy. The object scatters or distorts the incident acoustic wave energy in a manner such that the wave energy emerging from the object into the acoustic medium produces within the medium distorted acoustic waves containing information describing or defining an image of the object. This acoustic wave information is converted or transformed into an optical image of the object by means an electronic ultrasonic image converter. Ultrasonic imaging systems of this type are well-known in the art and have been described in various prior art publications. One of these publications is in the National Academy of Sciences, Report No. NRG–MAC–2016, entitled "Ultrasonic Imaging" by R. S. Mackay et al.

The primary advantage of ultrasonic imaging over conventional optical imaging resides in its ability to image the interior of optically opaque objects. This capability stems from the fact that acoustic energy utilized in ultrasonic imaging penetrates and is scattered or distorted by optically opaque materials in much the same way as light waves penetrate and are scattered by optically transparent materials. As a consequence, the distorted acoustic wave energy emerging from an optically opaque object contains information defining each interior point of the object in much the same way that the light waves transmitted through an optically transparent object contain information defining each interior point of the transparent object. In a case of conventional optical imaging system, the distorted light waves emerging from the object are focused by a suitable optical system to image the object. In the existing ultrasonic imaging systems, on the other hand, the distorted acoustic waves emerging from the object are converted to an optical image of the object by an electronic ultrasonic image converter.

In the existing ultrasonic imaging systems, conversions of the distorted acoustic wave energy emerging from the object being examined to an optical image of the object is accomplished with the aid of an electronic image converter. This converter has a cathode-ray tube on which the image is produced. The object to be examined is placed within an acoustic wave coupler containing an acoustic wave transmission medium, such as water. Acoustic wave energy is then transmitted through the object into the acoustic medium. During passage of the acoustic waves through the object, the waves are scattered or distorted by each point of the object in such a way that each such point becomes, in effect, a separate acoustic wave source. The acoustic waves emanating from these separate point sources within the object combine to produce in the acoustic medium the distorted acoustic waves describing or defining each point source. These distorted acoustic waves pass through an acoustic lens which focuses the distorted acoustic wave energy upon an extended area of piezoelectric material which is scanned by an electron beam to generate a fluctuating electrical signal corresponding to the acoustic image information incident on the piezoelectric material. The fluctuating electrical signal is applied to a cathode-ray tube to produce on the face of the tube an optical image of the object.

Such electronic ultrasonic image conversion systems are quite complex and costly and suffer from various other disadvantages which need not be elaborated on here. Suffice it to say that the present invention seeks to overcome these disadvantages by utilizing the interaction of light waves with the distorted acoustic waves from the object being examined to convert the emerging distorted acoustic wave image information to an observable optical image of the object or to some other useful output.

The basic principle and mechanics of light-sound wave interaction has been recognized and studied for a number of years. By way of example, the results of some of these studies are contained in the following references:

(1) Debye, P. and Sears, F. W., Proc. National Academy of Science, Washington, 18, (1932), p. 409.

(2) Adler, R., "Interaction Between Light and Sound," IEEE Spectrum, p. 42, May 1967.

(3) Korpel, A., "Visualization of the Cross Section of a Sound Beam by Bragg Diffraction of Light," Applied Physics Letters, vol. 9, No. 12, December 1966.

Another prior art publication dealing with the interaction of light and sound waves is the Adler Patent No. 3,373,380. This patent discloses an acouso-optical system which utilizes light-sound wave interaction to transform an electrical signal into an equivalent light signal.

Generally speaking, the basic technique of light-sound wave interaction involves the generation of acoustic waves within an acoustic wave coupler, sometimes referred to as a Bragg cell, containing an acoustic wave transmission medium. A beam of monochromatic light is transmitted through this acoustic medium transverse to the propagation vector of the acoustic wave within the medium so that the light wavefronts impinge the acoustic wavefronts. The light wavefronts are diffracted and modulated by the acoustic waves in such a way that the light waves emerging from the medium produce a light field which is modulated in accordance with the acoustic input of the wave coupler.

In the acousto-optical signal translation system disclosed in the Adler patent, an acoustic transducer is mounted on one end of the wave coupler and is energized by the electrical signal to be translated or converted into a light signal. This electrical signal may be amplitude or frequency modulated. When thus energized, the transducer generates within the wave transmission medium of the wave coupler acoustic waves which fluctuates in frequency or amplitude according to the modulated electrical signal impressed on the transducer. The light source of the Adler system is a laser whose collimated beam of spatially coherent monochromatic light is directed through the wave coupler to a following projecting telescope. This telescope focuses the refracted light waves emerging from the wave coupler onto a light sensitive medium to produce a concentrated light field or spot on the medium. During passage of the light-beam through the wave coupler, the light waves are modulated by the acoustic waves to provide at the light sensitive medium a modulated light field or spot whose intensity fluctuates in accordance with the modulation of the transducer input signal. The primary contribution of the Adler system resides in its organization whereby the light waves impinge the acoustic waves approximately at the Bragg angle to yield an optimum light output signal. This organization involves, in part, precise orientation of the laser axis at the Bragg angle relative to the propagation vector of the acoustic waves through the wave coupler.

The inventions disclosed in the copending applications involve a novel acousto-optical imaging method and apparatus embodying an improved technique for converting or transforming to an optical image or other useful optical output, the distorted acoustic wave information resulting from transmission of acoustic wave energy of fixed frequency through an object into an acoustic wave transmission medium. This transformation of the distorted acoustic wave information to equivalent light information is accomplished directly by a light-sound wave interaction rather than indirectly with the aid of an electronic ultrasonic image converter. Such light-sound wave interaction yields a light sideband which may be magnified to produce an observable image of the object or otherwise processed to provide usable output information corresponding to the acoustic information represented by the distorted acoustic waves.

More specifically, the inventions of the copending applications involve acoustic coupling of the object being examined to an acoustic source and an acoustic wave transmission medium in a manner such that acoustic wave energy from the source is transmitted through the object to the acoustic medium. During their transmission through the object, the acoustic waves are distorted or scattered by each point of the object in a manner such that each such point becomes, in effect, a separate point acoustic source. The acoustic waves from the separate point sources combine to produce in the acoustic medium the distorted acoustic waves which thus comprise, effectively, the sum or resultant of the acoustic waves from all of the point sources. As a consequence, the distorted acoustic waves traveling from the object through the acoustic medium contain acoustic information defining each point of the object.

Transformation or conversion of this distorted acoustic wave information to equivalent light information, such as an image of the object, is accomplished by directing a beam of monochromatic light from a laser through the acoustic medium, transverse to the propagation vector of the acoustic waves through the medium. The wavefronts of light impinge the traveling distorted acoustic wavefronts within the medium at an oblique angle, preferably the Bragg angle, such that the light waves are modulated by the acoustic waves to produce a number of light sidebands each defining an optical image of the object. One of these sidebands, preferably a first order sideband, is magnified by an appropriate optical system to produce an observable image of the object within an external viewing plane.

The object being examined may be acoustically coupled in various ways to the acoustic source and the acoustic wave transmission medium or wave coupler in which the light-sound wave interaction occurs. Thus, the object may be placed in direct contact with the acoustic source or indirectly coupled to the source through the acoustic medium and/or some other acoustic wave transmission body. Similarly, the object may be placed in direct contact with the acoustic medium or indirectly coupled to the medium through an intervening acoustic wave transmission body. For example, the object may be contained directly within the acoustic medium, and the acoustic wave energy from the acoustic source transmitted through the meduim to the object and then from the object back to the medium. Alternatively, the acoustic wave energy may be transmitted to the object either directly or through some intervening wave transmission medium other than the acoustic medium and then from the object into the acoustic medium.

According to the preferred practice of the copending applications, the acouso-optical method and apparatus are practiced and organized in such a way that the light-sound wave interaction which occurs within the acoustic medium satisfies the Bragg angle at a large number of points within the interaction zone. As will be immediately recognized by those versed in the art, this results in maximum refraction of the light waves by the distorted acoustic waves, and thereby, maximum intensity and definition of the resulting optical image. In this regard, it should be noted that a unique feature of the copending invention resides in the use of a tapered light-beam which yields the Bragg angle at a large number of points within the light-sound wave interaction. Such a tapered light-beam presents a two-fold advantage. First, it eliminates the necessity of precise orientation of the light source at the Bragg angle relative to the propagation vector of the acoustic waves through the acoustic medium, as required in the Adler patent. Secondly, it provides an image of higher quality.

SUMMARY OF THE INVENTION

The present invention utilizes the optical holographic and acousto-optical techniques in combination to produce an interior holographic image of an object which may be optically opaque. In this regard, it should be noted that while the primary advantage of the invention resides in its ability to internally image an optically opaque object, the technique of the invention may be employed, as well, to image optically transparent or translucent objects. The invention may also be used for interferometric analysis of both optically opaque and optically transparent or translucent objects.

According to the present invention, the acousto-optical imaging technique of the copending applications is employed in the same manner as outlined above except that the light-beam from the laser is split prior to its entrance into the acoustic transmission medium to produce an object beam and a reference beam. The object beam then passes through the acoustic medium and its contained distorted acoustic waves to produce an object sideband of given frequency or order, preferably a first order sideband, which is magnified to produce an optical image of the object.

The reference beam from the laser is modulated to produce a reference sideband of the same frequency or order as the object sideband. These sidebands are mixed to produce a holographic fringe pattern which may be photographically recorded on a film. The result is a hologram of the object, from which may be reconstructed an interior holographic image of the object. In the present technique of interferometric analyses, the object is strained after initial exposure of the film and the latter is then re-exposed to produce a hologram for reconstructing a holographic image displaying the internal strain pattern created by straining the object.

The reference beam may be modulated in various ways to obtain the required reference sideband. According to the preferred practice of the invention, modulation of the reference beam is accomplished by passing the beam through the acoustic transmission medium of the acousto-optical imaging system in such a way that the beam passes through undistorted acoustic waves from the acoustic source.

DESCRIPTION OF THE PREFERRED EMBODIMENTS

Figures 1, 2, 3, 4, 5:
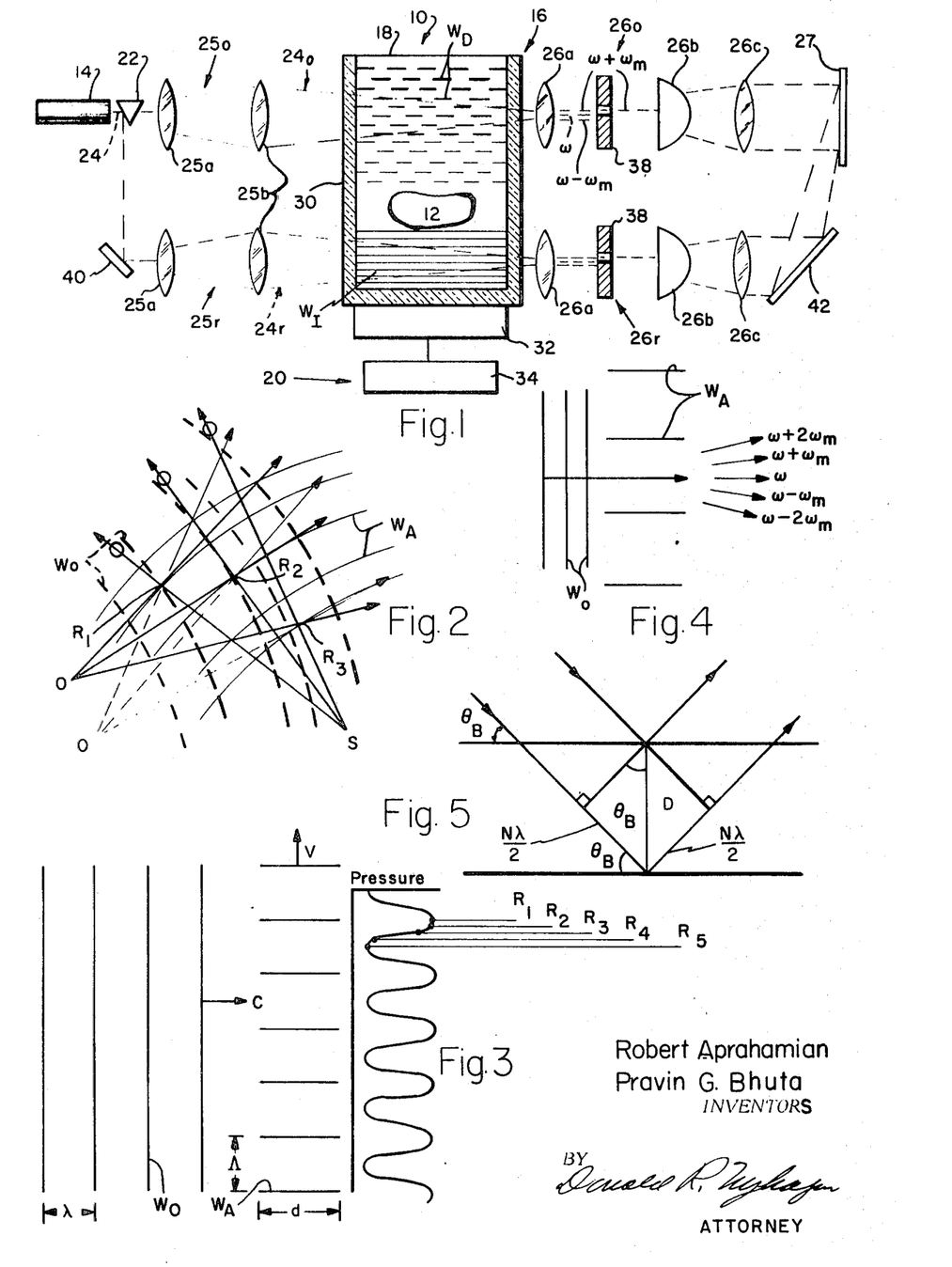
FIG. 1 diagrammatically illustrates an acousto-holographic system according to the invention.
FIG. 2 depicts the acousto-optical imaging principle involved in the invention.
FIG. 3 depicts an enlarged portion of FIG. 2 as well as certain acoustic pressure variations which are involved in acousto-optical imaging.
FIG. 4 depicts the so-called Sears-Debye condition.
FIG. 5 depicts simple constructive interference of light waves by a diffraction grating.

Turning first to FIG. 1 of these drawings, there is illustrated acousto-optical holographic apparatus 10 according to the invention for producing an interior holographic image of an object 12 which may be optically opaque.

In general terms, the apparatus comprises a source 14 of coherent monochromatic light, hereafter called a laser, a wave coupler or Bragg cell 16 including an acoustic wave transmission medium 18 containing the object 12, an acoustic energy source 20, a beam splitter 22 between the laser and Bragg cell for splitting the laser beam 24 into an object beam $24_o$ and a reference beam $24_R$, and Bragg celle entrance and exit optics $25_o$, $25_R$, $26_o$, and $26_R$ for the beams. At this point, it should be noted that as used in the present disclosure, the terms "sound," "acoustic waves," and other similar expressions, are most general. That is to say, the terms "sound" and "acoustic waves" encompass all acoustic wave frequencies including subaudible, audible, and ultrasonic frequencies.

Briefly, during operation of the apparatus 10, the object 12, acoustic medium 18, and acoustic source 20 are acoustically coupled in such a way that acoustic wave energy is transmitted from the acoustic source to the object and then from the object to the acoustic medium. The acoustic waves $W_I$ incident on the object are distorted or scattered by the object and produce within the acoustic medium distorted acoustic waves $W_D$. The object and reference beams $24_o$, $24_R$ from the laser 14 are transmitted through their respective entrance optics $25_o$, $25_R$ into the acoustic medium 18, transverse to the propagation vector of the acoustic waves through the medium in a manner such that the reference beam passes through the undistorted acoustic waves $W_I$ incident on the object 12 and the object beam passes through the distorted acoustic waves $W_D$ emerging from the object. The light wavefronts of the object beam and reference beam impinge the wavefronts of their respective acoustic waves within the acoustic medium and are modulated and refracted in the manner hereinafter explained. In this regard, it will become evident from the ensuing description that refraction of the light waves occurs because of the variations in the density of the acoustic medium across the acoustic waves resulting from the acoustically induced pressure variations which constituted the acoustic waves.

The light wavefronts of the object and reference beams $24_o$, $R_R$ impinge the acoustic wavefronts within the acoustic medium 18 at an oblique angle, preferably the Bragg angle, such that light of each beam which emerges from the acoustic medium is composed of refracted rays of the same carrier frequency as the original laser beam 24 and additional refracted light rays of various sideband orders or frequencies. Each emergent sideband of the object beam defines an optical image of both the interior and exterior of the object 12. According to the present invention, a selected image defining sideband, preferably a first order sideband, of the object beam and the corresponding sideband of the reference beam are mixed to create a holographic fringe pattern which is photographically recorded on a film 27 to produce a hologram of the interior and exterior of the object 12. To this end, the object and reference beam entrance optics $25_o$, $25_R$ are arranged to maximize the intensity and thereby the image definition of the selected sidebands by permitting Bragg reflection of the beams only within the angles of these sidebands, and the beam exit optics $26_o$, $26_R$ are arranged to transmit and magnify the selected sidebands only and then mix these sidebands to produce the holographic fringe pattern on the film 27. The holographic image of the object is reconstructed by illuminating the hologram with the reference beam $24_R$. According to a feature of the invention, the object 12 may be strained after initial exposure of the film and the film then re-exposed to record a second fringe pattern. In this case, the reconstructed holographic image displays the internal stress pattern created in the object by straining it.

The basic acousto-optical technique discussed above for reacting the light-beam $24_o$, i.e. the object beam, with the distorted acoustic waves $W_D$ to image the object 12 constitutes the subject matter of the copending applications. As noted in the latter applications and in the present introductory discussion, the phenomena of light-sound wave nteraction and acoustic or ultrasonic imaging using an ultrasonic image converter have been known and studied or a number of years. Accordingly, it is unnecessary to elaborate in detail on these phenomena in the present disclosure. However, in the interest of a full and complete understanding with the present invention, it is deemed advisable to discuss briefly some of the principles involved in these phenomena.

First, consider the actions which occur when acoustic waves are transmitted through an object into an acoustic wave transmission medium. This, of course, requires acoustic coupling of the acoustic wave source of generator, the object, and the acoustic medium. As noted earlier and explained in greater detail in the later description, this acoustic coupling may be accomplished in various ways. Also, various acoustic media may be employed. In a particular embodiment of the invention illustrated in FIG. 1, for example, the acoustic medium 18 is a liquid, such as water, and the object 12 is acoustically coupled to the liquid by immersion in the liquid. The acoustic medium is contained within a tank 30 which, together with the liquid, constitutes the wave coupled or Bragg cell 16. The acoustic medium 18 and the walls of the tank 30 are transparent to the light from the light source 14. In the particular embodiment of the invention illustrated, the light source is a laser, and the acoustic medium 18 and the walls of the tank 30 are optically transparent. This acoustic wave source or generator 20 comprises a transducer 32, such as a piezoelectric crystal, which is mounted on one wall of the tank and is thus acoustically coupled to the acoustic medium through the wall. Transducer 32 is connected to a driver 34 which energizes the transducer at a fixed frequency. It will be understood, therefore, that the acoustic source 20 generates the acoustic waves $W_I$ of fixed frequency which are transmitted through the acoustic medium 18 to the object 12 and then through the object back into the acoustic medium.

During their passage through the object 12, the acoustic waves $W_I$ generated by the acoustic source 20 behave in much the same way as light waves passing through an optically transparent object. That is to say, the acoustic waves are distorted, i.e. defracted or scattered, at each point within the object in such a way that each point effectively becomes a separate point acoustic source from which acoustic waves emanate. As a consequence, the acoustic wave energy emanating from the object 12 into the acoustic medium 18 is effectively the sum or resultant of the acoustic waves from all of the separate point sources of the object and produces the distorted acoustic waves W. These distored waves have a complex wave pattern which constitutes acoustic information describing or defining each point of the object.

According to the invention of the copending applications, this acoustic information is transformed or converted into equivalent light information by the interaction of the wavefronts of the light (object) beam $24_o$ with the distorted acoustic wavefronts within the acoustic medium 18. This light information is then optically processed by the object beam exit optics $26_o$ to produce an image of the object. To understand this acousto-optical transformation or conversion, first consider FIG. 2, in which S is a point source of acoustic waves $W_A$ of fixed frequency within a surrounding acoustic wave transmission medium and O is a point source of monochromatic light waves $W_o$. In this figure, the acoustic waves and light waves are illustrated as curved lines which represent the traveling acoustic and light wavefronts. The light wavefronts impinge the acoustic wavefronts within the acoustic medium as depicted in the figure. Consider also FIG. 3, which represents a narrow incremental band or column of the acoustic waves and a narrow incremental band or column of the like waves in FIG. 2. As is well-known to those versed in the art and depicted in the graph at the right-hand side of FIG. 3, the acoustic waves $W_A$ within the acoustic column constitute cyclic compression and rarefaction or relief zones within the acoustic wave transmission medium and include regions $R_1$ of maximum compression, regions $R_2$ of partial compression, regions $R_3$ of zero compression, regions $R_4$ of partial relief, and regions $R_5$ of maximum relief. The index refraction of the acoustic medium is a function of its density, and its density in turn is a function of the pressure of the medium. It is evident, therefore, that the refraction index of the acoustic medium varies progressively across each acoustic wave. The propagation velocity C of the light waves $W_o$ through the acoustic medium is a function of the refraction index according to the equation $$C = C_{0/\eta} \qquad (1)$$

where $C_o$ is the velocity of the light waves in air;
$\eta$ is the refraction index of the acoustic medium.

The propagation velocity of light waves through the acoustic medium thus varies across each acoustic wave.

During their passage through the acoustic wave transmission medium, the light waves also undergo a phase shift $\Delta\phi$. This phase shift is expressed by the equation $$\Delta\phi = \frac{2\pi d}{\lambda_0}(\Delta\eta) \qquad (2)$$

where $d$ is the width of the acoustic column;
$\lambda_0$ is the wavelength of the light waves in air;
$\Delta\eta = -1$ With this discussion in mind, consider the situation depicted in FIG. 3, wherein the light waves $W_o$ impact the column of acoustic waves $W_A$. Since the acoustic waves travel or propagate through the acoustic medium, the density of the medium and hence its refraction index at any given point along the column fluctuates in cyclic fashion between minimum and maximum values. As a consequence, the light waves $W_o$ are both frequency and phase modulated as they traverse the acoustic column. This modulation phenomena and its consequences are well known. Thus, it is known that if a wave, i.e. a carrier wave, of frequency $\omega$ is modulated by a frequency $\omega_m$, a series of multiple waves or wave components is created including the original carrier wave of frequency $\omega$ and a set of sidebands whose frequencies differ by $\omega_m$ from one another and from the carrier frequency. In the particular situation depicted in FIG. 3, the light waves $W_o$ are modulated by the acoustic waves $W_A$ in such a way that the light emerging from the acoustic column will consist of a carrier component having the frequency $\omega$ of the incident light waves and sidebands of the order N with frequency $\omega \pm N\omega_m$, where $\omega_m$ is the fixed frequency of the acoustic waves. It can be shown that these sidebands have oblique propagation vectors inclined at the angle $\phi$ relative to the carrier vector according to the equation $$\tan \phi = \pm \frac{N\lambda}{\Lambda} \qquad (3)$$

where $\lambda$ is the wavelength of the light waves in the acoustic medium;
$\Lambda$ is the wavelength of the acoustic waves.

In other words, the sidebands are uniformly dispersed through an angle equal to the ratio of the wavelength of the light waves to the wavelength of the acoustic waves.

It will be immediately recognized by those versed in the art that this sideband dispersion occurs instantaneously upon impact of the light waves with the acoustic column. As a consequence, a given sideband produced by impact of incident light waves on a compressed region of the acoustic column will eventually enter a relieved or rarefied region of the column. This may cause destructive interference and tend to extinguish the sideband. Such destructive interference of a selected sideband can be reduced by imposing the condition that the lateral spread of this sideband relative to the carrier propagation vector shall not be greater than one-half the width $d$ of the acoustic column. It can be shown that this condition requires $$d \ll \frac{\Lambda^2}{2\lambda |N|} \quad (4)$$

where

N is the order of the selected sideband, and the angular spread $\phi$ is small such that $\tan \phi \simeq \phi$.

When this condition obtains, then, all of the sidebands of order N and lower order will experience no destructive interference, while all of the sidebands of higher order than N will experience a high degree of total destructive interference. This condition is the well-known Sears-Debye condition and is diagrammatically illustrated in FIG. 4. As will appear from the later description, the acousto-optical imaging technique may be practiced in such a way that Sears-Debye condition is satisfied. This is hereafter referred to in places as practicing or operating in the Sears-Debye regime.

In addition to the above discussed phenomenon of destructive interference, light-sound wave interaction may also involve constructive interference of the light waves. Such constructive interference involves Bragg reflection. In this regard, it will be recognized by those versed in the art that the acoustic column in FIG. 3 constitutes, in effect, a traveling diffraction grating in which successive isopiestric planes of each acoustic wave $W_A$ effectively constitute successive grating strata. When a light wave impacts such a grating, the wave is reflected from the successive strata. Bragg's law defines the condition under which such a refraction grating will reflect an incident light wave with maximum intensity. More specifically, Bragg's law define the condition under which the parts of the incident light wavefront which reflect from the successive grating strata will recombine in phase. When this condition obtains, constructive interference occurs, and the different parts of the reflected wavefront re-enforce one another when they combine. FIG. 5 depicts the phenomena of Bragg reflection from two successive strata of a diffraction grating. With respect to this figure, Bragg's law of reflection is expressed mathematically as $$\text{SIN } \theta_B = \frac{N\lambda}{2D} \quad (5)$$

where $\theta_B$ is the Bragg angle,
N is an integer, and
D is the grating distance.

Assume now the situation wherein the width $d$ of the acoustic column is greater than that prescribed in the Sears-Debye condition. In other words $$d \gg \frac{\Lambda^2}{2\lambda |N|} \quad (6)$$

where the angular spread $\phi$ (Equation 3) is small such that $\tan \phi \simeq \phi$. The condition expressed by this equation is referred to as the Bragg condition. It can be demonstrated that when the Bragg condition exists, the light waves entering the acoustic column undergo reflection and refraction by the acoustic waves as well as constructive and destructive interference in such a way that the light emerging from the acoustic column will consist of the carrier and that sideband or those sidebands whose order N satisfy the Bragg Equation 6 for the particular width $d$ of the acoustic column through which the light passes. All other sidebands will be cancelled by destructive interference. For example, assume $$d = \frac{\Lambda^2}{2\lambda 2} (\text{i.e. } N=2) \quad (7)$$

Under these conditions, the only light sideband whose order N will satisfy the Bragg Equation 6 is the first order so that the only light emerging from the column will be the carrier and the first order sidebands. If $$d = \frac{\Lambda^2}{2\lambda 4} (\text{i.e. } N=4) \quad (8)$$

the light emerging from the acoustic column can consist of the carrier and the first six sidebands whose orders N are $\pm 1$, $\pm 2$, and $\pm 3$, respectively, assuming light exists at those Bragg angles. In the ensuing description, practicing or operating under the conditions defined by the Bragg Equation 6, is referred to in places as practicing or operating in the Bragg regime. It will become evident to those versed in the art that the present invention may be practised and operated within either the Sears-Debye regime or the Bragg regime. It will become further evident as the description proceeds, however, that maximum image intensity and definition are attained by operating in the Bragg regime. Accordingly, operation in this regime constitutes the preferred practice of the invention.

Figure 6:
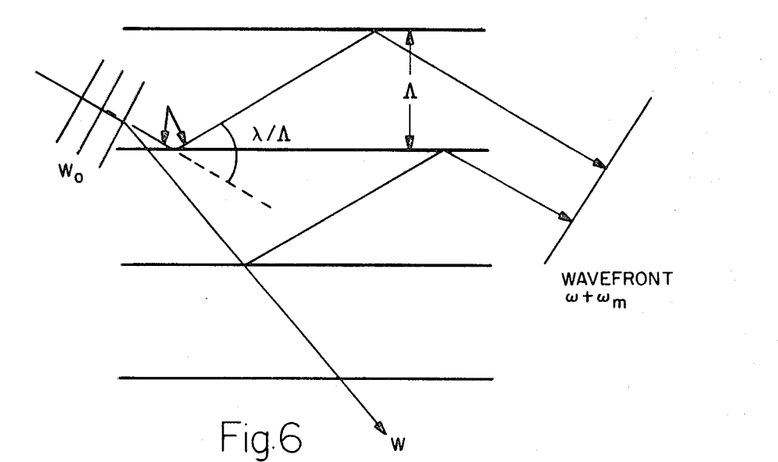
FIG. 6 depicts constructive light interference as it occurs in acousto-optical imaging.

In this latter regard, it can be demonstrated that when operating in the Bragg regime, transmission of light waves through the acoustic column in such a way that the light waves impact the column at the Bragg angle for a selected light sideband whose order satisfies the Bragg Equation 6 for that particular column, has two effects which are highly beneficial in the present acousto-optical imaging invention. One of these effects is that the selected sideband experiences constructive interference and hence reenforcement as it passes through the acoustic column, as depicted in FIG. 6. The other effect is that the remaining sidebands which do not satisfy the Bragg condition for the acoustic column undergo conversion or transformation to the order of the selected sideband. As a result, the light energy of the selected sideband emerging from the acoustic column represents a greater percentage of the total available light energy incident on the column. This greater light energy of the selected emerging sideband results in correspondingly increased image intensity.

With the foregoing discussion of light-sound wave interaction in mind, consider again the situation depicted in FIG. 2. It will be observed that the traveling light waves $W_o$ and the acoustic waves $W_A$ impinge or intersect one another at various angles as they propagate through the acoustic medium. From the preceding discussion, it will be understood that diffraction of the light waves by the acoustic waves occurs within all regions of the light-sound wave interaction zone and that maximum defraction occurs within those regions wherein the light waves impinge the acoustic waves at the Bragg angle corresponding to the wavelengths of the light and acoustic waves in the acoustic medium. These Bragg regions are designated in FIG. 2 as $R_1$, $R_2$, and $R_3$. If the refracted light rays from these Bragg regions are traced back or extended, it will be found that they intersect at point $O'$ and thus define a virtual image of the acoustic source S. Assume now a number of separate acoustic sources rather than a single source as depicted in FIG. 2. In this case, the acoustic waves from the several point sources combine to produce a resultant complex acoustic wave pattern containing information defining the several sources. The refracted light rays which emanate from the Bragg regions of the complex acoustic waves define multiple virtual images of the several acoustic sources. If the refracted light rays are focused in a viewing plane, real images of the acoustic sources will be produced in the image plane. It can be demonstrated that this imaging technique results in image magnification according to the equation $$M = \frac{\lambda}{\Lambda} \quad (9)$$

This means if two point acoustic source $S_1$ and $S_2$ are separated by the distance $S_1S_2$, their images will be separated by the distance $$M \overline{(S_1 S_2)} = \frac{\lambda}{\Lambda} \overline{(S_1 S_2)}$$

The present invention utilizes the above discussed phenomena of light-sound wave interaction and acousto-optical imaging to produce an image of the object 12 in FIG. 1. Thus, it will be recalled from the earlier discussion that the acoustic waves $W_I$ from the acoustic source 20 are transmitted through the object 12 into the acoustic wave transmission medium 18. During their passage through the object, the acoustic waves are scattered or distorted at each point within the object in a manner such that each such point becomes, effectively, a separate point acoustic source. The acoustic waves from these separate point sources combines to produce the column of distorted acoustic waves $W_D$ which emanate from the object into the acoustic medium and interact with the light waves of the object beam $24_o$. As noted earlier and explained below, the acousto-optical system is preferably arranged to induce Bragg reflection of the object beam $24_o$ from each of the distorted acoustic waves propagating through the acoustic medium. The light of the object beam which emerges from the acoustic medium is composed of the light carrier frequency of the laser beam 24 and two or more light sidebands, depending upon the various factors discussed earlier. Each emerging sideband contains information defining each point of the object 12, and hence an image of the object. The emerging light rays of the object beam pass through the object beam exit optics $26_o$ which transmit and magnify the light rays of a selected emerging sideband only to produce an optical image of the object.

It will be understood by those versed in the art that Bragg reflection of the object beam $24_o$ from the distorted acoustic waves $W_D$ emanating from the object 12 into the acoustic medium 18 requires impact of the distorted acoustic wavefronts by the light wavefronts of the object beam at the correct oblique angle of incident, i.e. the Bragg angle. According to the disclosure in the earlier mentioned Adler patent, such Bragg reflection is accomplished by using a laser light source having its propagation axis oriented at the Bragg angle relative to the propagation vector of the acoustic waves through the acoustic medium. This particular method of achieving Bragg reflection has two disadvantages when considered for use in the present acousto-holographic system. First, because the laser beam is collimated, Bragg reflection would occur at only a relatively small number of points of each acoustic wavefront, thus resulting in an image of poor quality. In other words, the laser beam is composed of parallel light rays all of which would impact the column of distorted acoustic waves $W_D$ at the same angle relative to the propagation vector of the acoustic waves in the column. As a consequence, Bragg reflection of the light rays from the acoustic wavefronts would occur only at those relatively few points, i.e. Bragg regions, where the local acoustic wavefront region is oriented at the Bragg angle relative to the propagation vector of the laser beam. Stated another way, a particular local acoustic wavefront region, to constitute a Bragg region, must be oriented precisely at the Bragg angle relative to the laser beam axis. Secondly, the Adler technique requires precise orientation of the laser axis relative to the propagation axis of the acoustic waves through the acoustic medium 18. This precise orientation is extremely difficult to both obtain and maintain.

According to a feature of the invention of the copending applications, the stated disadvantages of the Adler technique of achieving Bragg reflection are avoided by utilizing a tapered object beam $24_o$ composed of nonparallel light rays which impact the column of distorted acoustic waves $W_D$ through a range of angles related to the taper angle of the light-beam. In this case, in order for a particular local acoustic wavefront region to constitute a Bragg region for effecting Bragg reflection of the incident object beam, it is only necessary that the angular attitude of that region, relative to the propagation axis of object beam, fall within a range of angles equal to the taper angle of the beam. In other words, any local acoustic wavefront region whose angle relative to the object beam axis falls within this angular range will provide a Bragg region at which Bragg reflection will occur as the wavefront travels through the light-sound wave interaction zone. As a consequence, the tapered object beam results in Bragg reflection at a relatively large number of points or regions of the distorted acoustic waves $W_D$ and produces a relatively high quality image.

Such a tapered light-beam may be obtained in various ways. FIG. 1 illustrates one method. In this case, the collimated object beam $24_o$ emerging from the beam splitter 21 is converted to a tapered object beam by the object beam entrance optics $25_o$. To this end, the entrance optics comprise a first diverging lens $25a$ which spreads the beam to divergent conical beam. Following the diverging lens is a converging lens $25b$ which condenses the divergent beam to form a convergent object beam $24_o$. The convergent object beam then passes through the wave coupler or Bragg cell 16 and in the absence of any acoustic wave disturbance or other disturbance in the acoustic medium would emerge from the coupler as a single beam which would come to focus at a point beyond the coupler.

During operation of the acoustic-optical system 10, the convergent object beam $26_o$ is frequency and phase modulated by the distorted acoustic waves $W_D$ traveling through the acoustic medium as discussed earlier. From this earlier discussion, it is evident that the light of the object beam which then emerges from the wave coupler 16 is composed of the object carrier and light sidebands whose number and order will depend on the width of the acoustic column and the angles at which the light rays of the convergent beam impact the acoustic column. It is further evident that each light sideband produced by the light-sound wave interaction has its own Bragg angle. If the taper or cone angle of the object beam is relatively large, the rays of the beam will impact the acoustic column at the Bragg angles for a number of different light sidebands. Under these conditions, these several sidebands will experience constructive interference, and several light sidebands would emerge from the wave coupler 16. As a consequence the light energy in each emerging sideband, which is the light energy available for imaging, would represent a correspondingly reduced fraction of the total available light energy of the original object beam. According to the preferred practice of the invention, the taper or cone angle of the object beam is made sufficiently small to encompass the Bragg angle of reflection of the first order sidebands only. Under these conditions, the higher order sidebands will not be formed and the first order sidebands will experience constructive interference. As a consequence, the light energy of each first order sideband of the object beam emerging from the wave coupler 16 and available for imaging will represent a relatively large fraction of the total available energy of the original object beam, and the intensity of the resulting image will be correspondingly increased.

Since only one of the first order sidebands of the object beam $24_o$ emerging from the Bragg cell 16 is used for imaging, it is desirable to transmit and magnify only the selected first order sideband used for imaging and to block the carrier and the other emerging first order sideband. In the particular embodiment of the invention illustrated in FIG. 1, this is accomplished by the object beam exit optics $26_o$. To this end, the exit optics comprise a microscope objective $26a$, a cylindrical magnifying lens $26b$, a final simple lens $26c$, and a pinhole mask 38 positioned behind the lens $26a$ in such a way as to block the object beam carrier and one first order sideband. The remaining sideband passes through a hole in the mask to produce an image of the object 12.

From the description to this point, it will be understood that the object beam $24_o$ passes through the Bragg cell 16 and is frequency and phase modulated by the distorted acoustic waves $W_D$ emerging from the object 12 into the acoustic medium 18. This modulation of the beam produces a first order light sideband, referred to herein as an object sideband; which is isolated and magnified by the object beam exit optics $26_o$ to define an optical image of the object. According to the present invention, the object sideband is mixed with a reference beam sideband, referred to herein as a reference sideband, of the same order, i.e. first order, as the object sideband to produce a holographic fringe pattern. This fringe pattern is photographically recorded on the film 27 to provide a hologram of the object 12.

It will be immediately evident to those versed in the art that the reference beam $24_R$ from the laser 14 may be processed in various ways to obtain the first order reference sideband which is mixed with the object sideband to obtain a hologram. In the particular acousto-holographic apparatus illustrated, the reference beam $24_R$ is processed to obtain the desired first order reference sideband by passing the reference beam first through the reference beam entrance optics $25_R$, than through the Bragg cell 16 in the region between the object 12 and acoustic transducer 32, and finally through the reference beam exit optics $26_R$ to the film 27. To this end, a mirror 40 is placed on the axis of the entrance optics $25_R$ to reflect the reference beam $24_R$ from the beam splitter 22 through the optics. The reference beam entrance optics, like the object beam entrance optics, includes a first diverging lens 25a and a following converging lens 26b for producing a convergent reference beam which passes through the Bragg cell. This convergent reference beam is phase and frequency modulated by the undistorted acoustic waves $W_I$ within the acoustic medium in essentially the same manner as discussed above in connection with the object beam $24_o$. Accordingly, the light of the reference beam emerging from the Bragg cell is composed of the reference beam carrier and first order sidebands.

The reference beam exit optics $26_R$, like the object beam exit optics $26_o$, comprise a microscope objective 26a, a cylindrical magnifying lens 26b, a final simple lens 26c, and a pinhole mask 28 behind the objective. Mask 28 is arranged to pass only the same light sideband as the mask 28 of the object beam exit optics. This latter sideband is the reference sideband referred to earlier. Following and on the axis of the reference beam exit optics is a mirror 42 which reflects the emerging reference sideband to the film 27. The present apparatus is arranged in a manner such that the object sideband and reference sideband incident on the film 27 interfere to produce a holographic fringe pattern which is photographically recorded on the film to create a hologram of the object 12. In this regard, it will be understood that the difference in path lengths of the object and reference beams from the laser 14 to the film 27 is less than the coherence length of the laser, such that a holographic fringe pattern will be produced.

Figure 7:
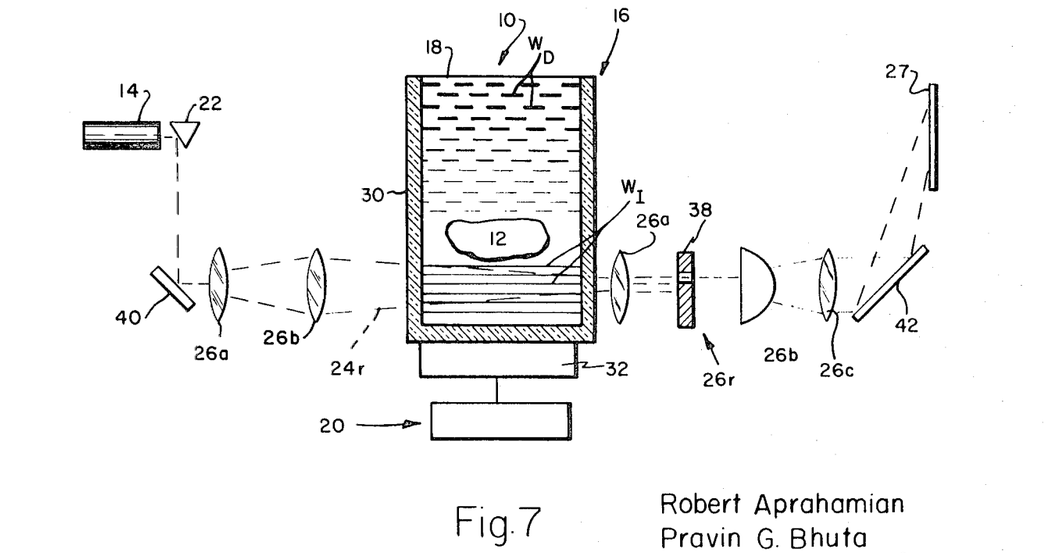
FIG. 7 illustrates reconstruction of the holographic image according to the invention.

Reconstruction of the holographic image of the object 12 is preferably accomplished by illuminating the hologram 27 with the reference sidebhand in the manner shown in FIG. 7. Alternatively, image reconstruction may be accomplished with any coherent monochromatic light. The holographic image produced with the present acousto-optical holographic apparatus is a three-dimensional image of both the interior and exterior of the object 12.

As noted earlier, the invention may also be utilized for interferometric stress analysis of the object 12. This is accomplished by straining the object after initial exposure of the film 27 to the holographic fringe pattern produced by the above described operation of the present acousto-holographic apparatus. Following straining of the object, the film 27 is again exposed to the object and reference sidebands to record on the film a second fringe pattern. The holographic image reconstructed from the resulting hologram plate then displays the internal stress pattern produced in the object by the strain forces applied to the object.

It is significant to note here that the object 12, acoustic medium 18, and acoustic transducer 32 may be acoustically coupled in other ways than that illustrated. Some of these alternative coupling methods are disclosed in the aforementioned copending applications. In at least some of these alternative coupling methods, it may be necesary to obtain the first order reference beam sideband required for holographic imaging by other techniques than transmission of the reference beam through the Bragg cell 16 in the manner shown, as by refracting the reference with a suitable optical grating.

What is claimed as new in support of Letters Patent is:

1. The acousto-holographic method of examining an object which comprises the steps of:

transmitting acoustic wave energy of given frequency through said object to an acoustic wave transmission medium transparent to light to produce in said medium distorted acoustic waves containing information defining an image of said object;

passing an object beam from a coherent light source through the acoustic medium in a manner such that said object beam is modulated by said distorted acoustic waves to produce an object light sideband of given order defining an optical image of said object;

modulating a reference beam from said light source to produce a reference light sideband of the same frequency as said object sideband by passing the reference beam through a moving diffraction grating which travels across the reference beam at the velocity of said acoustic wave energy in said medium and has an effective grating width equal to the wavelength of said acoustic wave energy in said medium; and mixing said object and reference sidebands to produce a holographic fringe pattern representing said object.

2. The method of claim 1 wherein: said object and reference sidebands are first order sidebands.

3. The method of claim 1 wherein: said reference beam is modulated to produce said reference sideband by passage through acoustic waves of said given frequency within a body of said acoustic medium and constituting said diffraction grating.

4. The method of claim 1 wherein:

said acoustic wave energy is transmitted through a first region of said acoustic medium to said object and then through said object to a second region of said medium;

said object beam passes through said second region of said acoustic medium; and said reference beam is acoustically modulated to produce said reference sideband by passage through said first region of said acoustic medium wherein the acoustic waves from said source constitute said diffraction grating.

5. The method of claim 1 including the additional steps of: exposing a sensitized film to said fringe pattern to record said pattern on said film, straining said object, and again exposing said plate to said fringe pattern to record a hologram containing information representing the internal stress pattern in said object.

6. The method of claim 1 including the additional steps of: photographically recording said fringe pattern on a sensitized film and developing the film to produce a hologram of said object, and illuminating said hologram with monochromatic coherent light to reconstruct a holographic image of said object.

7. The method of claim 6 wherein: said reference light sideband provides said image reconstruction light, and said reference beam is acoustically modulated to produce said reference sideband.

8. The method of claim 7 wherein:

said acoustic wave energy is transmitted through a first region of said acoustic medium to said object and then through said object to a second region of said medium;

said object beam passes through said second region of said acoustic medium; and said reference beam is acoustically modulated to produce said reference side band by passage through said first region of said acoustic medium wherein the acoustic waves from said source constitute said diffraction grating.

9. An acousto-holographic system for examining an object comprising:

a source of monochromatic coherent light;

a light-acoustic wave coupler containing an acoustic wave transmission medium transparent to light from said source;

means including an acoustic source for transmitting acoustic wave energy of given frequency through said object to said acoustic medium to produce in said medium distorted acoustic waves containing information defining an image of said object;

means for passing an object beam from said light source through said acoustic medium in a manner such that said object beam is modulated by said distorted acoustic waves to produce an object sideband of given order defining an optical image of said object;

means providing a moving diffraction grating having an effective velocity substantially equal to the velocity of said acoustic wave energy in said acoustic medium and an effective grating width substantially equal to the wavelength of said acoustic wave energy in said medium; and means for passing a reference beam from said light source through said grating to produce a reference sideband of the same frequency as said object sideband and mixing said object and reference sidebands to produce a holographic fringe pattern representing said object.

10. The system of claim 9 wherein: said means providing a diffraction grating comprises acoustic waves of said given frequency in a body of said acoustic medium.

11. The system of claim 9 wherein:

said acoustic wave energy is transmitted through a first region of said acoustic medium to said object and then through said object to a second region of said medium;

said object beam passes through said second region of said acoustic medium; and said diffraction grating comprises the acoustic waves in said first region of said acoustic medium.

12. The system of claim 9 wherein: said object and reference sidebands are first order sidebands.

References Cited

UNITED STATES PATENTS 3,488,438    1/1970    Korpel ______________ 340—5 X

OTHER REFERENCES

Holography and its Applications, A. E. Ennos, Contemp. Phys., 1967, vol. 8, No. 2, pp. 153, 162–165.

New Holographic Method for the Investigation of Light Diffraction by Ultrasonic Standing Waves, A. Alippi et al., Acoustica, vol. 20, 1968, pp. 84–87.

RICHARD C. QUEISSER, Primary Examiner

J. P. BEAUCHAMP, Assistant Examiner

U.S. Cl. X.R.

73—67.5 H; 340—5 H; 350—3.5; 356—32

UNITED STATES PATENT OFFICE
CERTIFICATE OF CORRECTION

Patent No. 3,626,753          Dated December 14, 1971

Inventor(s) Robert Aprahamian/Pravin G. Bhuta

It is certified that error appears in the above-identified patent and that said Letters Patent are hereby corrected as shown below:

| | | |
|---|---|---|
| Column 2, | line 28 | after "means" insert -- <u>of</u> --; |
| Column 6, | line 8 | correct "celle" to read -- <u>cell</u> --; |
| | line 41 | correct "$R_R$" to read -- $\underline{24_R}$ --; |
| Column 7, | line 12 | correct "source of" to read -- <u>source or</u> --; |
| Column 10, | line 71 | correct "$S_1S_2$" to read -- $\overline{S_1S_2}$ --; |
| Column 11, | line 12 | correct "combines" to read -- <u>combine</u> --; |
| Column 13, | line 57 | correct "sidebhand" to read -- <u>sideband</u> -- |

Signed and sealed this 6th day of May 1975.

(SEAL)
Attest:

RUTH C. MASON
Attesting Officer

C. MARSHALL DANN
Commissioner of Patents
and Trademarks